United States Patent [19]

Takahashi et al.

[11] Patent Number: 4,549,117
[45] Date of Patent: Oct. 22, 1985

[54] CIRCUIT FOR GENERATING SIGNAL FOR CORRECTING DEFLECTION OF ELECTRON BEAM

[75] Inventors: Kenji Takahashi, Kanagawa; Shizuka Ishibashi, Musashimurayama; Koji Kudo, Hachioji; Yukihiro Masuda, Kodaira; Takuma Kodama, Kokubunji, all of Japan

[73] Assignees: Hitachi, Ltd.; Hitachi Denshi Kabushiki Kaisha Ltd., both of Tokyo, Japan

[21] Appl. No.: 578,208

[22] Filed: Feb. 8, 1984

[30] Foreign Application Priority Data

Mar. 11, 1983 [JP] Japan ............................... 58-40456

[51] Int. Cl.⁴ ............................................. H01J 29/56
[52] U.S. Cl. ...................................... 315/371; 358/60
[58] Field of Search ................... 315/368, 370, 371; 358/60, 64

[56] References Cited

U.S. PATENT DOCUMENTS

| 4,203,054 | 5/1980 | Sowter | 315/368 |
| 4,318,032 | 3/1982 | Kureha | 358/60 |
| 4,395,662 | 7/1983 | Sexton, Jr. | 358/60 |
| 4,401,922 | 8/1983 | Kamata et al. | 315/368 |
| 4,422,019 | 12/1983 | Meyer | 315/368 |

*Primary Examiner*—Theodore M. Blum
*Attorney, Agent, or Firm*—Antonelli, Terry & Wands

[57] ABSTRACT

A circuit for generating a signal for correcting deflection of electron beam, which circuit is advantageously used as, for example, a circuit for correcting registration in a multi-tube type color television camera. In the correction signal generating circuit, quantities of corrections at intersections defined by a plurality of lines extending in horizontal and vertical directions so as to divide a surface scanned by the electron beam into a plurality of areas are stored in terms of digital values. The digital signal read out from the memory is converted into an analog signal. The analog signal is then supplied to low-pass filter means. From the output signal of the low-pass filter means, quantities of correction are prepared for the scanning lines present between the two intersections located adjacent to each other in the vertical direction. In the circuit, the shading is positively prevented from occurring.

8 Claims, 25 Drawing Figures

| $X_1Y_1$ | $X_2Y_1$ | $X_3Y_1$ | $X_4Y_1$ | $X_5Y_1$ | $X_6Y_1$ | $X_7Y_1$ |
|---|---|---|---|---|---|---|
| $X_1Y_2$ | | | | | | $X_7Y_2$ |
| $X_1Y_3$ | | | | | | $X_7Y_3$ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| $X_1Y_{478}$ | | | | | | $X_7Y_{478}$ |
| $X_1Y_{479}$ | | | | | | $X_7Y_{479}$ |
| $X_1Y_{480}$ | $X_2Y_{480}$ | | | | $X_6Y_{480}$ | $X_7Y_{480}$ |

CIRCUIT FOR GENERATING SIGNAL FOR CORRECTING DEFLECTION OF ELECTRON BEAM

BACKGROUND OF THE INVENTION

The present invention relates to a correction signal generating circuit for generating a correction signal for correcting a deflected position of an electron beam. The correction signal generating circuit according to the present invention can be advantageously used as a registration correcting circuit for a multi-tube type color television camera. Additionally, the correction signal generating circuit according to the invention can be employed not only for the correction of registration in the multi-tube type television camera but also as a dynamic focusing wave generator for a single tube type color camera, a convergence circuit in a color television receiver, a shading correction wave generator for a television signal and others.

Heretofore, a so-called three-tube type color television camera which includes three imaging tubes (also referred to as the image pick-up tubes) corresponding to three primary colors (red, green and blue), respectively, has been used in the field of the television broadcasting and for applications where high image quality is required.

In addition to the three tube type color television (TV) camera mentioned above, there are known a two-tube type color TV camera which includes one imaging tube destined for picking up a luminance signal and the other for an obtained chrominance signal and a four-tube type color television camera which includes a fourth image pick-up tube for detecting the luminance signal in addition to the three tubes for detecting the primary color signals of red, green and blue, respectively. As a technological feature common to these multi-tube color television cameras, so-called registration adjustment techniques are required for superposing the images produced by the individual imaging tubes. In general, in the case of the television camera in which the image pick-up tubes are employed, tolerances in manufacturing the electron gun and the deflection coil assembly as well as electrooptical distortions attributable to these tolerances and peculiar to the type of deflection system as adopted give rise to the problem of various geometric distortions being produced.

In the hitherto known multi-tube type color television camera as well as the camera which is designed especially for the measuring purpose in which the problem of the geometric distortion is serious, the deflection current is superposed with a correction wave such as, for example, a parabolic wave and saw-tooth wave or alternatively the deflection current is modulated with the correction wave for correcting the geometric distortion mentioned above.

The hitherto known method of correcting the geometric distortion by modifying the deflection of the electron beam in the manner described above is effective for correcting the distortion so far as the distortion of low order is concerned. However, in the present state of the technology of the color television camera such as the multi-tube type color TV camera, there arises a demand for adjustment of registration at a higher precision, which demand can no longer be satisfied by the correction only of the distortion of low order. In particular, in the case of a high definition television camera in which the number of the scanning lines exceeds 525 lines of the existing system, a higher precision is required for the image registration.

To meet the above demand, there has recently been developed a digital resistration circuit which is designed to correct the distortions of high order by resorting to the use of a computer and a memory system (reference is to be made to Japanese Patent Application Laid-Open No. 2166/1982).

According to the proposed digital registration system, values for correction are given for every intersection of division lines which divide the screen of television in both horizontal and vertical directions.

The values for correction given for every intersection have to be read out in a sequential order in synchronism with the scanning period. Further, once the values for correction have been determined, the values read out every frame or field must remain unchanged. Accordingly, a memory for storing the correction values for every intersection is required. Further, since the correction values are given to the intersections in one-to-one correspondence, correction values have to be obtained through interpolation for the scanning lines present between the adjacent correction values in the horizontal and vertical direction.

It has however been found that in a digital registration system in which the linear interpolation is effected in the vertical direction, such an undesirable phenomenon that outputs of the image pick-up tubes undergo rapid changes at the intersections where the correction for registration is carried out, i.e. phenomenon of the so-called "shading" does occur to a disadvantage. Since the quantity of correction for registration is naturally different among the image pick-up tubes for red, green and blue colors, the shading makes appearance as color nonuniformity and luminance non-uniformity to degrade remarkably the image or picture quality.

SUMMARY OF THE INVENTION

An object of the present invention is to overcome the difficulties of the prior art described above and provide an electron-beam-deflection correcting signal generating circuit which is immune to the problem of the shading. Another object of the invention is to provide a registration correcting circuit for a multi-tube type color television camera in which the shading is prevented from occurring.

The above objects are accomplished according to the present invention by providing an electron-beam-deflection correction signal generating circuit which comprises memory means for storing in terms of digital values the quantities of correction for intersections of plural horizontal and vertical lines which divide a screen scanned by an electron beam, converter means for converting the digital signal read out from the memory means into an analog signal, low-pass filter means for passing therethrough low frequency components of the analog signal outputted by the converter means, and means for deriving and generating an amount of correction for the scanning lines present between the two adjacent intersections in the vertical direction.

DESCRIPTION OF THE PREFERRED EMBODIMENTS

For having a better understanding of the teachings of the present invention, description will first be made of the hitherto known techniques for correcting the electron beam deflecting current.

Figure 1:
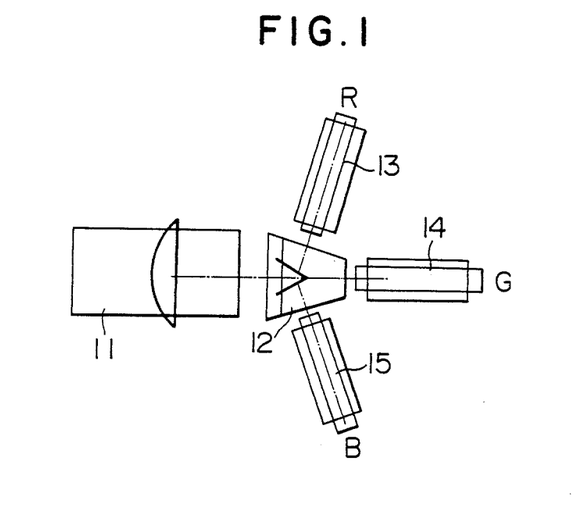
FIG. 1 is a schematic view for illustrating the principle of a three-tube type color television camera.

As described hereinbefore, a so-called three-tube type color television (TV) camera which includes three imaging tubes corresponding to the primary colors of red, green and blue, respectively, as is shown in FIG. 1, is employed in the television broadcasting and other applications where a high quality of image or picture is required. Referring to FIG. 1, a reference numeral 11 denotes a taking lens system, 12 denotes an optical system for separating three colors, and 13, 14 and 15 denote imaging tubes provided in correspondence with primary colors, red, green and blue, respectively. The output signals of the imaging tubes 13, 14 and 15 are amplified and processed to ultimately produce a color television signal. In addition to the three-tube type color television camera mentioned above, there are known a two-tube type color camera which includes one imaging tube destined for picking up luminance signal and the other for obtaining chrominance signal and a four-tube type color television camera which includes a fourth image pick-up tube for detecting the luminance signal in addition to the three tubes for detecting the primary color signals of red, green and blue, respectively. As a technological feature common to these multitube color television cameras, a so-called registration adjustment techniques are required for superposing the images produced by the individual imaging tubes. In general, in the case of the television camera in which the image pick-up tubes are employed, tolerances in manufacturing the electron gun and the deflection coil assembly as well as electrooptical distortions attributable to these tolerances and peculiar to the type of deflection system actually employed give rise to the problem of various geometric distortions being produced.

Figure 2A:
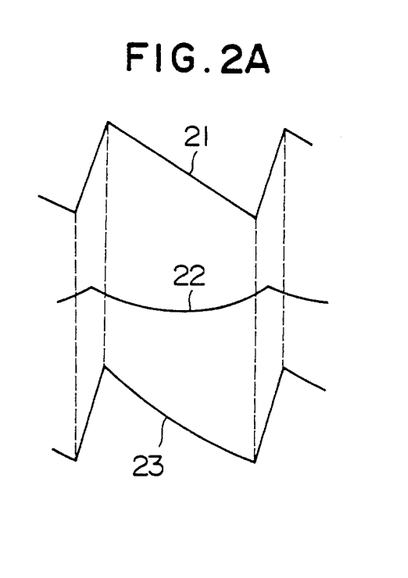
FIGS. 2A and 2B are views illustrating waveforms heretofore employed for correcting the electron beam deflecting current.
Figure 2B:
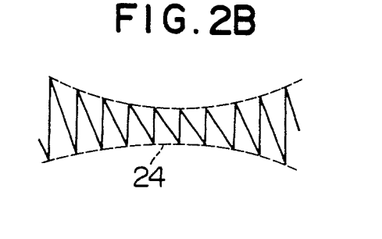
Figure 2C:
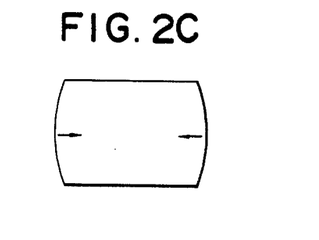
FIG. 2C is a schematic view for illustrating correction of barrel distortion.

In the hitherto known multi-tube color television camera and a camera designed for the measuring purpose where the geometric distortion is a serious problem, there are adopted a method of correcting the geometric distortions mentioned above according to which a waveform 21 of a deflecting current (or deflecting voltage) is superposed with a correction wave such as parabolic wave and saw-tooth wave or modulated by the correcting waveform, as is illustrated in FIGS. 2A and 2B. More specifically, referring to FIG. 2A, the deflecting current (voltage) wave 21 is superposed with a parabolic wave 22 as the correction wave, whereby a wave designated by 23 can be obtained for varying the linearity of deflection. Referring to FIG. 2B, there is shown an example of the waveform 24 which is obtained by modulating the horizontal deflection current (voltage) of a television camera with a parabolic wave of a vertical scanning frequency. According to these methods, a barrel distortion appearing on a television screen in the horizontal direction can be corrected by varying the distortion in the directions indicated by arrows as shown in FIG. 2C.

The hitherto known method of correcting the geometric distortion by modifying the deflection in the manner discribed above is effective for correcting the distortion so far as the distortion of low order is concerned. However, in the present state of the technology of the color television camera such as the multi-tube type color camera, there arises a demand for adjustment of registration at a higher precision, which demand can no longer be satisfied by the correction only of the distortion of low order. In particular, in the case of a high definition television camera in which the number of the scanning lines is greater than 525 lines of the existing system, a higher precision is required for the registration of the images.

To meet the above demand, there has recently been developed a digital registration circuit which is designed to correct the distortions of high order by resorting to the use of a computer and a memory system (reference is to be made to Japanese Patent Application Laid-Open No. 2166/1982).

Figure 3:
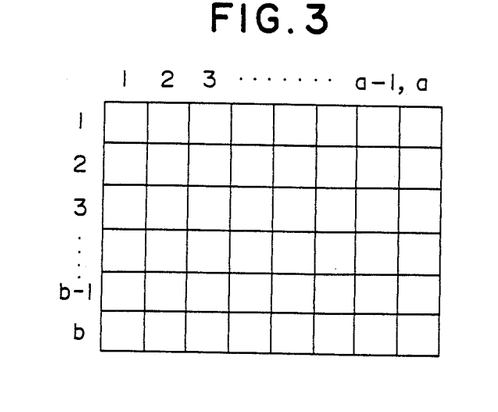
FIG. 3 is a schematic view for illustrating division of a television screen adopted in a digital registration correction.

In the proposed digital registration system, a screen of television is divided in a number a in the horizontal direction and in a number b in the vertical direction, as is shown in FIG. 3, wherein values for correction are given to each of intersections of these division lines.

Figure 4:
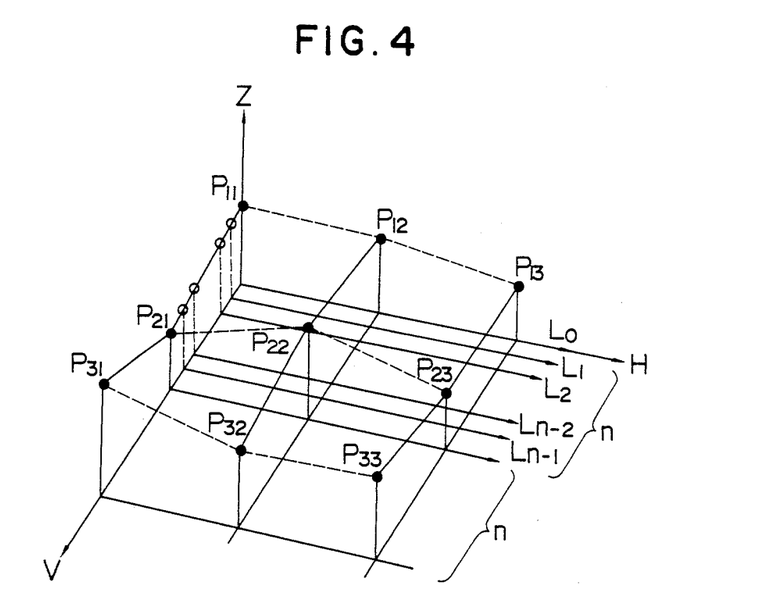
FIGS. 4 and 5A and 5B are views for illustrating the principle of interpolation effected between intersection points.

The values for correction have to be read out in the sequential order in synchronism with the scanning period. Further, once the values for correction have been determined, the same values must be read out every frame or field. Accordingly, there is required a non-destructive memory for storing the correction value for every intersection. Besides, since the correction values are given to the intersections in one-to-one correspondence in the case of this system, the value for correction must be obtained through interpolation for the scanning lines present between the adjacent intersections in the horizontal and vertical directions. FIG. 4 is a view for illustrating an example of the method for the interpolation mentioned above. It is now assumed that the horizontal direction of the screen is represented by H with the vertical direction represented by V and that the value for correction is given to each of the intersections or cross-points P. When the value for correction is taken along the Z-axis, the quantity of correction can be represented by a curved surface interconnecting or containing the individual intersections or cross-points. Each of the spaces between the intersection points $P_{11}$ and $P_{21}$, between the intersection points $P_{21}$ and $P_{31}$ and so forth is divided by n horizontal scanning lines $L_0$ to $L_{n-1}$. However, since the values for correction are given only to the intersections P, the actual vaues for correction which are read out in synchronism with the scanning have to be calculated in each of the horizontal and vertical directions. This calculation procedure is referred to as the interpolating procedure. First, the interpolating procedure in the vertical direction will be elucidated. Heretofore, the interpolating procedure in the vertical direction, e.g. the interpolating procedure taken between the intersection points $P_{11}$ and $P_{21}$, is realized through approximation by using a straight line in the vertical direction. More specifically, the correction values corresponding to the n scanning lines between the intersection points $P_{11}$ and $P_{21}$ are constituted by values lying on a straight line which connects the intersection points $P_{11}$ and $P_{21}$ to each other. At the first scanning line $L_0$, the correction values previously determined for the intersections $P_{11}$, $P_{12}$, $P_{13}$ and so forth, respectively, are read out. At the second and succeeding scanning lines $L_1$ to $L_{n-1}$, there are read out the correction values which are calculated in accordance with the following expressions:

$$P_{11} + \left( \frac{P_{11} - P_{21}}{n} \right) \times k, P_{12} + \left( \frac{P_{12} - P_{22}}{n} \right) \times k \quad (1)$$

where k represents the scanning line number (i.e. k=0, 1, 2, 3, . . . , or n−1) and n represents a constant.

Next, the interpolating procedure in the horizontal direction will be reviewed.

Figure 5A:
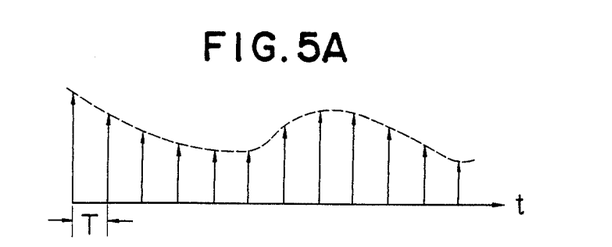
Figure 5B:
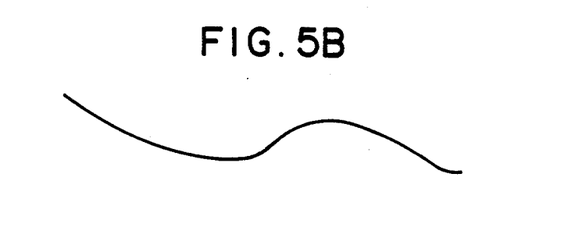

At the first scanning line L , the correction values for the intersection point $P_{11}$, $P_{12}$, $P_{13}$ and so forth are read out. At the second scanning line $L_1$, the interpolation values calculated in accordance with the aforementioned expression (1) are read out. More specifically, when the period at which the correction values for the intersection points $P_{11}$, $P_{12}$, $P_{13}$ and so forth are read out is represented by T, it will be seen from FIG. 5A that the information for correction is sampled at the period T. Accordingly, it is apparent from the sampling theorem that information of the frequency corresponding to the Nyquist limit of sampling, i.e. the frequency down to ½T can be displayed, as is well known in the art. By passing the signal obtained through the sampling effected at the period T through a low-pass filter having a cut-off frequency of ½T, there can be obtained a continuous signal shown in FIG. 5B. In this way, the interpolating procedure in the horizontal direction can be readily realized with the aid of a low-pass filter having a cut-off frequency not higher than a half of the sampling frequency.

Figure 6:
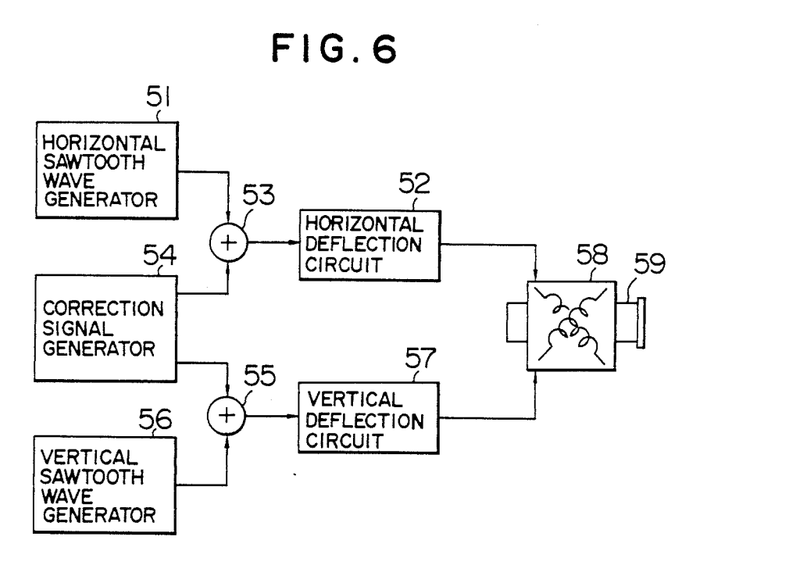
FIG. 6 is a view for illustrating a general concept of the correction of registration.

As will be appreciated from the foregoing, in the system in which the screen is divided into divisions in number a in the horizontal direction and divisions in number b in the vertical direction and in which the correction values in both horizontal and vertical directions are given to each of the divisions, information for correction at every point for interpolation in the horizontal direction can be obtained merely by smoothing the information obtained for the corresponding points through interpolation in the vertical direction. For performing the correction of the geometrical distortion on the division basis to thereby correct the registration among the individual imaging tubes for the colors of red, green and blue by using the correction wave thus obtained, horizontal and vertical saw-tooth waves generated by a horizontal saw-tooth wave generating circuit 51 and a vertical saw-tooth wave generating circuit 56, respectively, are added with correction waves which are produced by a correction wave generating circuit 54 in synchronism with the vertical scanning and the horizontal scanning through adder circuits 53 and 55, respectively, whose outputs are applied to a horizontal deflection circuit 52 and a vertical deflection circuit 57, respectively, to thereby drive a deflection coil system 58 for controlling position of the electron beam of an imaging tube 59, as is shown in FIG. 6. By performing this operation for each of the imaging tubes for color signals of red, green and blue, the registration can be accomplished at a higher fineness or definition.

It has however been found that in the digital registration system in which the linear interpolation is effected in the vertical direction in the manner described above, such an undesirable phenomenon that outputs of the image pick-up tubes become different at the intersections where the correction for registration is carried out, i.e. the so-called "shading" does occur, to a disadvantage. Since the quantity of correction for registration is naturally different among the image pick-up tubes for red, green and blue colors, the shading makes appearance as color non-uniformity and luminance non-uniformity to degrade remarkably the image quality.

The inventor of the present application has examined and analyzed the causes for generation of the shading in the linear-interpolation based digital registration system. The results of the examination will be mentioned below.

Figure 7:
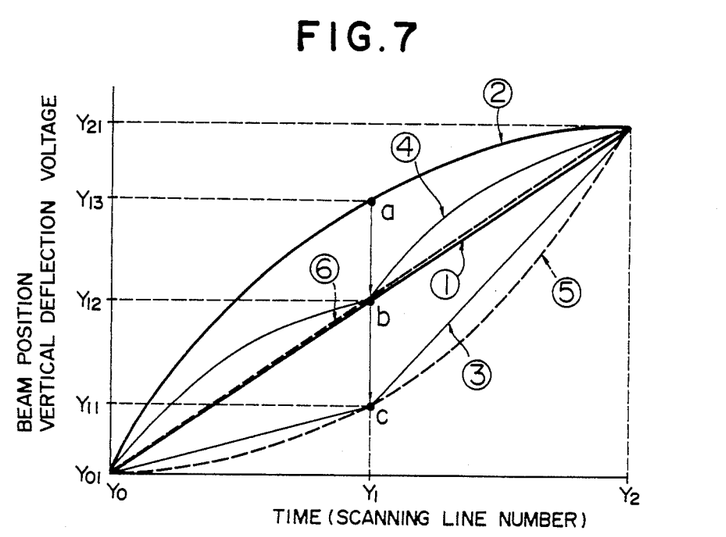
FIG. 7 is a view illustrating relationships among vertical deflection voltage, beam position and scanning time.
Figure 8:
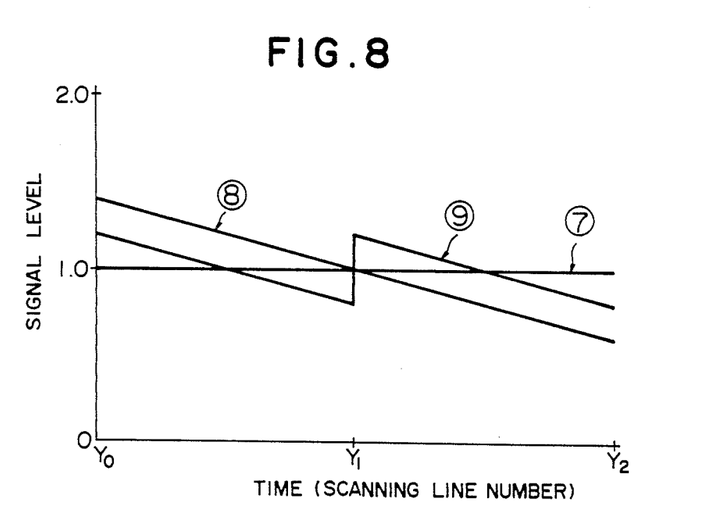
FIG. 8 is a view to be considered in combination with FIG. 7 and illustrates graphically a relationship between the output signal level and the scanning time.

FIG. 7 graphically shows relationships between vertical deflection voltage and beam position both taken along the ordinate and the scanning time in the vertical direction taken along the abscissa, while FIG. 8 graphically shows a relationship between the output signal level and the scanning time.

In case the actual beam position has a distortion due to error in the registration as indicated by a solid curve ② even when the vertical deflection voltage is normal as indicated by a solid line curve ① in FIG. 7, the signal level will be linearly decreased as indicated by a solid line ⑧ in FIG. 8. This is because the scanning line density of the electron beam in the image pickup tube is initially thin and progressively increased. In contrast, when the linear interpolation is made at a time point $Y_1$, the vertical deflection voltage varies, as indicated by a polygonal line curve ③ in FIG. 7. The beam position at that time is such as indicated by a solid line curve 4 . It will be seen that although a point a is corrected to a point b, other points remain uncorrected, forming upward bulges. The corresponding signal level is in the sawtooth-like form having an offset at the time point $Y_1$, as indicated by a solid line curve 9 in FIG. 8. When the signal level undergoes a rapid change between the adjacent scanning lines, the picture as produced looks very unnatural and is uncomfortable to the observer. The occurrence of such phenomenon can be explained by the fact that the linear interpolation is accompanied with an abrupt change or discontinuity in the signal level although the actual distortion of the image represents a smooth change even if it occurs randomly. Next, a geometrical pattern displayed on a monitor screen will be considered.

Figure 9A:
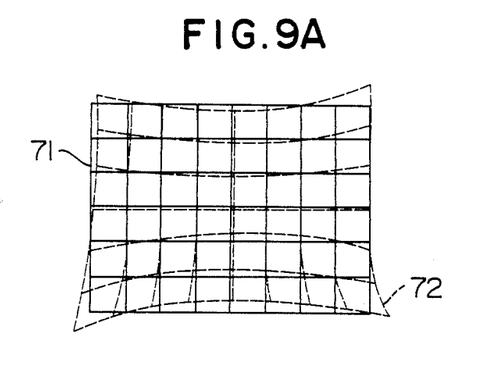
FIGS. 9A to 9C are views showing an example of the geometric distortion and hitherto known method of correcting the registration.

FIG. 9A is a view showing an example of error in registration produced on a monitor screen. For the convenience of illustration, distortion is shown exaggerated.

In response to a reference pattern 71 shown in a solid line, the image pickup tube produces as the output thereof a distorted pattern 72 shown in a broken line. The nature of distortion is such that most of distortions represent smooth changes. In other words, distortion of very high order is extremely rare. It is believed that distortion is usually of the second to the fourth order.

Figure 9B:
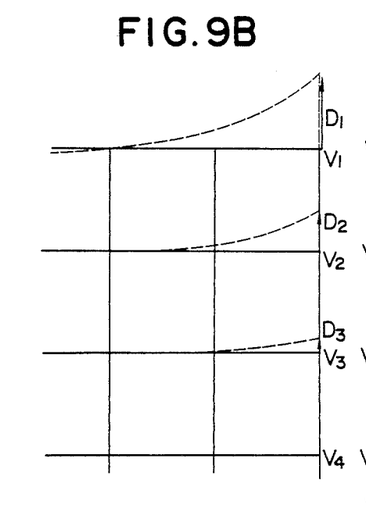
Figure 9C:
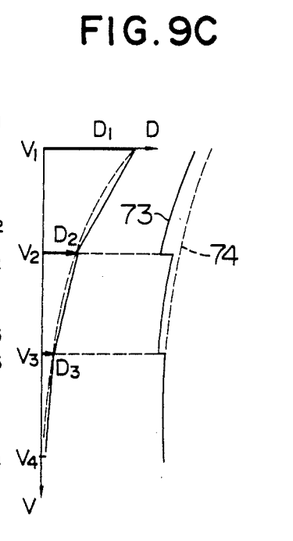

FIG. 9B shows in an enlarged fragmental view a portion of the patterns in FIG. 9A, and FIG. 9C is a view for graphically illustrating a relationship between the amount of misregistration D taken along the abscissa and the position V of the scanning line taken along the ordinate.

Referring to FIG. 9B, it is assumed that a distorted pattern depicted in broken line is produced on the monitor screen. Denoting magnitude of misregistration by $D_1$, $D_2$, $D_3$ and so forth as viewed from the top, the magnitude of misregistration is decreased in the downward direction. When magnitude of misregistration is taken along the abscissa with the position V of the scanning line being taken along the ordinate, the relation between D and V is such as graphically illustrated in FIG. 9C. It will be seen that the error in registration (i.e. misregistration) will usually so vary as to depict a smooth curve, as is indicated by a broken line 74 in FIG. 9C.

According to the hitherto known method described hereinbefore, this smooth curve is linearly interpolated in the manner indicated by a solid line 73 in FIG. 9C. More specifically, referring to FIG. 9C and assuming that the points at which values for correction are to be set are represented by $V_1$, $V_2$ and $V_3$, respectively, the linear interpolation brings about bends or inflections at the points $V_2$ and $V_3$, respectively.

Figure 10:
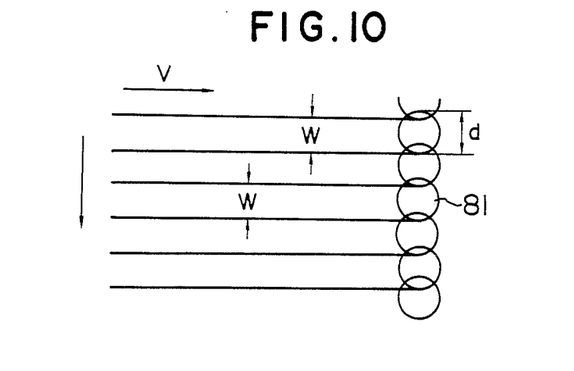
FIG. 10 is a view for illustrating mechanism of generation of the shading due to variation in the electron beams of an imaging tube.

FIG. 10 is a view for illustrating the mechanism of generation of the shading due to variations in the electron beam of an image pick-up tube.

By referring to FIG. 10, description will be made of a relationship between geometric distortion and the output current of the image pick-up tube. For the convenience of description, it is assumed that the electron beam is of a circular cross-section and has a constant diameter d independent of locations on the screen. Further, it is assumed that the scanning with the electron beam denoted by 81 is performed from the left to the right in the horizontal direction on the screen of the image tube and that the vertical scanning is performed from the top toward the bottom.

In the case of a conventional image pick-up tube of 2 or ⅔ inch type, relation of the distance W between the adjacent scanning lines to the electron beam diameter d is expressed by $$d > W \qquad (2)$$

This means that the whole electric charge of the scanned screen surface is read out within a single field even when the interlaced scanning is adopted. Now representing the speed of the electron beam by v and the quantity of electric charge per unit area by $\Delta Q$, the output signal current $I_s$ of the imaging tube is given by the following expression:

$$I_s = \Delta Q \cdot W \cdot v \qquad (3)$$

Assuming that $\Delta Q$ and $\Delta v$ are constant, rate of change of the signal current $dI_s/dP$ relative to the position P is given by $$dI_s/dP = \Delta Q \cdot v \cdot dW/dP \qquad (4)$$

In other words, the rate of change in the signal current $I_s$ is equivalent to the differential of the inter-scanning-line distance (i.e. distance between the adjacent scanning lines) W. In this connection, it should be noted that the scanning lines appear as being bent upwardly on the monitor screen, as is indicated by broken line curves in FIG. 9B. This means that the interscanning-line distance is narrowed on the screen of the image pick-up tube. Accordingly, as the electron beam moves from $V_4$ to $V_3$ and thence to $V_2$ and $V_1$, the output signal current of the imaging tube is progressively decreased, as indicated by the solid line curve ⑧ in FIG. 8. Usually, magnitude of distortion is of the order of 1 to 2% at maximum. Further, the shading makes appearance smoothly as described hereinbefore. Accordingly, the distortion (or error in the registration) will now provide eyesore to the observer to any appreciable degree. However, when this misregistration is corrected through the linear interpolating procedure, as is illustrated in FIG. 9C, the derivative undergoes abrupt changes around the points $V_2$ and $V_3$, resulting in that the signal current is correspondingly caused to vary stepwise, as indicated by the solid line curve 73 in FIG. 9C. The broken line curve 74 represents the shading before the correction. When the misregistration is corrected stepwise, the bends on inflections resulting from the linear interpolation make appearance unnaturally and discomfortably to the human eyes.

For the reason described above, the correction of the misregistration through the linear interpolation is restricted to the range in which the shading provides no significant eyesore, whereby the practically applicable range of correction is correspondingly narrowed. Accordingly, in order to accomplish the digital correction of registration effectively, the vertical interpolation between the adjacent values or data of correction should be performed as smoothly as possible.

Figure 11:
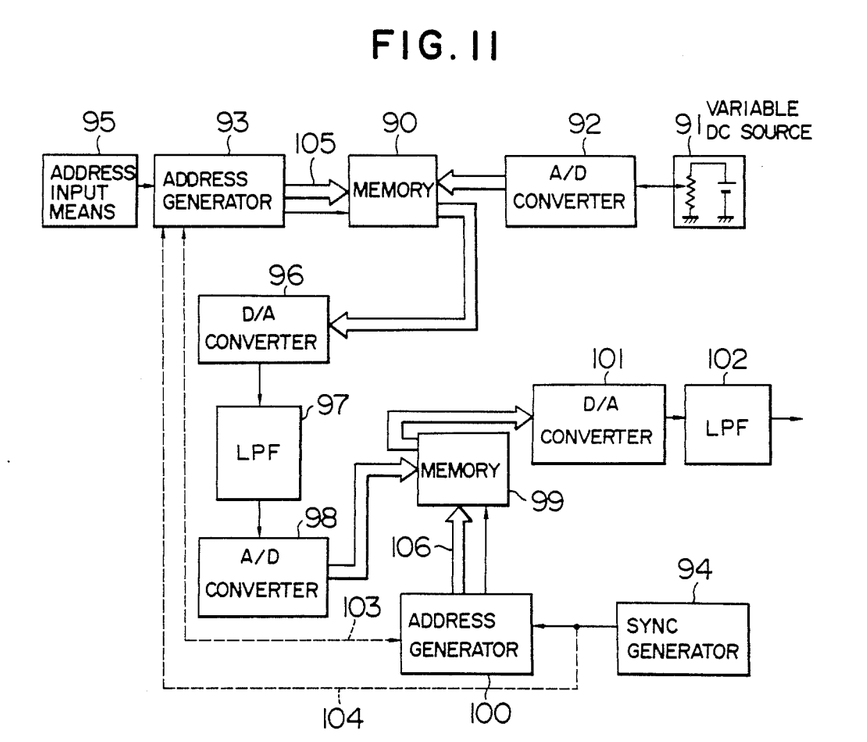
FIG. 11 is a block diagram showing a registration correcting signal generator circuit according to an exemplary embodiment of the invention.

FIG. 11 shows in a block diagram an arrangement of a correction signal generator circuit for producing a signal for correcting the registration (i.e. for reducing misregistration or error in registration) according to an embodiment of the present invention.

Since the circuits conventionally required for the three-tube type color television camera such as the saw-tooth wave generating circuit, deflection circuit and others may be constituted by those known in the art, description of them is omitted, and only the correction wave generating circuit will be elucidated. With the present invention, importance is put on the manner in which the vertically interpolated wave is generated as smoothly as possible in synchronism with the scanning.

Referring to FIG. 11, reference numeral 90 denotes a memory, 91 denotes a variable direct current (DC) source, 92 denotes an analog-to-digital (A/D) converter, 93 denotes an address generator, 94 denotes a synchronizing signal generator, 95 denotes an address input device or means, 96 denotes a digital-to-analog (D/A) converter, 97 denotes a low-pass filter (LPF), 98 denotes an A/D converter, 99 denotes a memory, 100 denotes an address generator, 101 denotes a D/A converter, and 102 denotes an LPF.

So far as the division of the screen by the vertical and horizontal lines and preparation of correction data at intersections thus formed are concerned, the hitherto known linear interpolation procedure is also adopted in carrying out the invention. However, the present invention teaches that the data for correction is subjected to a D/A conversion and caused to pass through a low-pass filter or LPF for accomplishing the interpolation.

Figure 12:
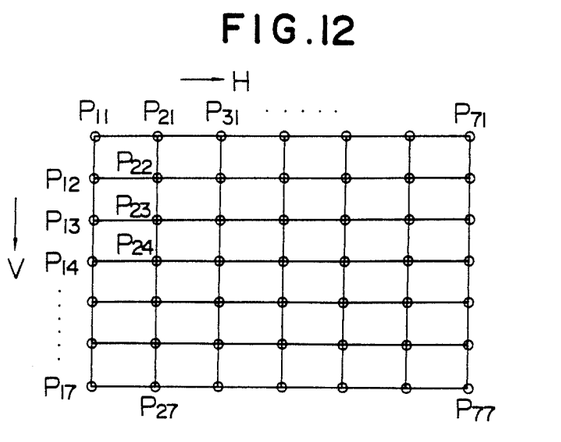
FIG. 12 is a view showing a memory map of a memory used in the circuit shown in FIG. 11.

FIG. 12 is a view illustrating a division pattern stored in the memory 90.

For simplification of illustration, FIG. 12 is depicted on the assumption that the screen is divided into six segments or divisions (areas) in both horizontal and vertical directions, respectively, so that the number of data for correction is 49 (=7×7), inclusive of those for the peripheral lines. The address of the data for correction is represented by P (H, V) where H is 1, 2, . . . or 7 and V is 1, 2, . . . or 7.

The correction data for each of the intersection points on the screen are stored in the memory 90. For inputting the data in the memory 90, operator first sets the addresses P (H, V) at which correction of registration is to be conducted with the aid of the address input device 95. Subsequently, the value of registration correction corresponding to the designated address is set at the variable DC source 91. The output signal of the variable DC source 91 is converted into digital data through the A/D converter 92 and applied to the input port of the memory 90. The output of the address input device 95 is supplied to the address generator 93, the output of which is coupled to the addressing terminals of the memory 90 in terms of a digital code. By setting a read/write (R/W) control terminal of the memory 90 to the write-in mode, data output from the A/D converter 92 is stored in the memory 90 at the designated address. By repeating the operation mentioned above, the distortion correcting data corresponding, respectively, to the intersection points P on the screen can all be loaded in the memory 90.

According to the present invention, it is taught that the correction data stored in the memory 90 for every intersection point (or cross-point) P are read out and caused to pass through the LPF 97 after having been converted to the analog signal through the D/A converter 96 and are subsequently supplied to another memory 99 by way of the A/D converter 98 to be stored therein as the smoothed correction data, for thereby preparing the smooth correction data which comply with the TV scanning on the basis of the correction data stored in the memory 90.

FIGS. 13A to 13D show waveforms and timing of the signals produced at circuit points of the correction waveform generating circuit shown in FIG. 11.

Figure 13A:
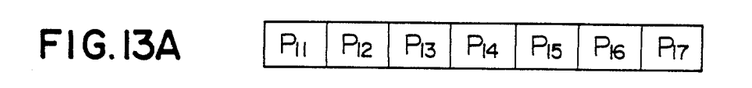
FIGS. 13A to 13D are views for illustrating waveforms and timings of signals produced at circuit points of the circuit shown in FIG. 11.
Figure 13B:
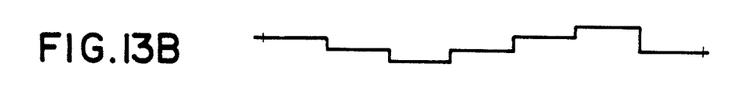
Figure 13C:
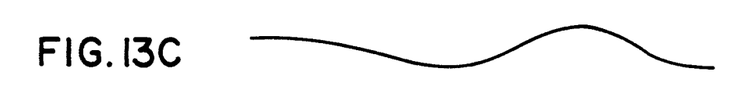
Figure 13D:
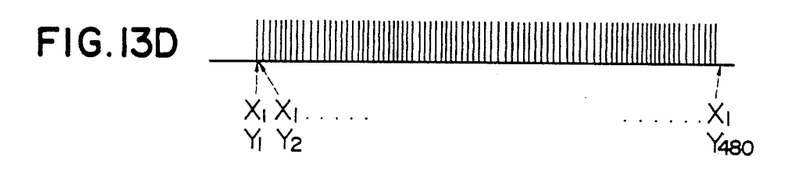

The contents of the memory 90, i.e. the data for the intersection points P shown in FIG. 12 are first read out in the vertical direction. More specifically, the column containing $P_{11}$, $P_{12}$, $P_{13}$, . . . , $P_{17}$ is first read out in the manner illustrated in FIG. 13A. This series of data read out in the vertical direction are immediately inputted to the D/A converter 96 to be converted into the analog quantities, whereby the output signal of the waveform shown in FIG. 13B is produced. Since this analog output signal contains lots of harmonic components, it is applied to the low-pass filter 97 of appropriate cut-off frequency and degree for attenuating the harmonic components, to thereby obtain the output signal of smoothed waveform such as shown in FIG. 13C.

Subsequently, the outputs signal (FIG. 13C) of the LPF 97 is again converted into a digital data signal through the A/D converter 98. In this connection, it should be noted that a number of data which is greater than that of the intersection points stored in the memory 90 can be obtained by shortening the sampling period in the A/D conversion. To this end, the conversion period of the A/D converter 98 is determined on the basis of the number of the scanning lines which are present between the adjacent data in the vertical direction (e.g. between $P_{11}$ and $P_{12}$). By way of example, suppose that the number of the valid vertical scanning lines (in one field) is 480. Then, the number of the scanning lines falling within one segment or division is 80 (=480÷6) because the screen is assumed to be vertically divided into six segments or areas, as shown in FIG. 12. Accordingly, the sampling frequency is set to a value which is 80 times as high as the frequency at which the memory 90 is read out in the vertical direction (refer to FIG. 13D). The output data of the A/D converter 98 are sequentially written in the memory 99 of the succeeding stage. It goes without saying that the frequency at which the data are written in the memory 99 is equal to the converting or sampling frequency of the A/D converter 98.

Figure 14:
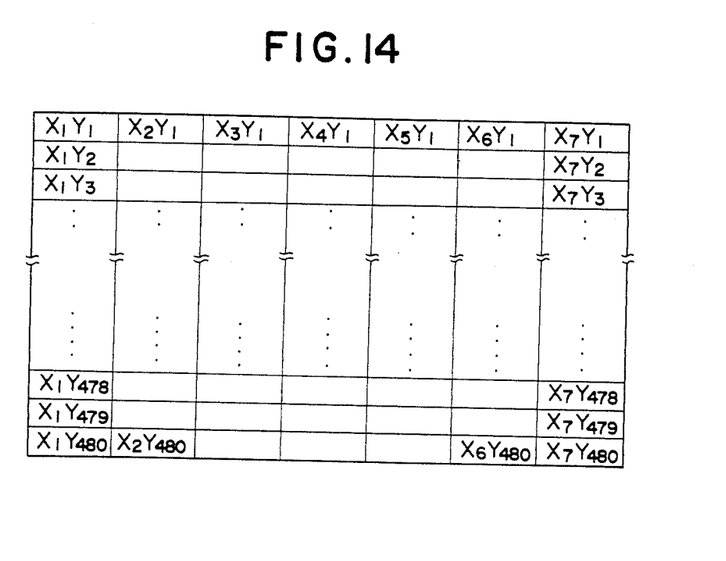
FIG. 14 is a view showing a memory map of a memory destined to store data for interpolation.

FIG. 14 is a view showing a memory map placed in the memory 99 shown in FIG. 11.

Since the data of the memory 90 is sampled at a frequency of 80 per unit (single) data (i.e. at the frequency corresponding to the number of the scanning lines), the number of data stored in the memory 99 in the vertical direction is same as that of the scanning lines, i.e. equal to 480.

In this way, the data for interpolation which are smoothed in the vertical direction are obtained for every scanning line and stored in the memory 99 in the manner shown in FIG. 14. By performing this operation repeatedly for the columns beginning with $P_{21}$, $P_{31}$, . . . and $P_{71}$, respectively, the data for interpolation in the vertical direction for the whole screen can be stored in the memory 99.

After all data have been stored in the memory 99, the address generator 100 is driven in synchronism with the synchronizing signal produced by the sync signal generator 94, whereby the reading address is generated to make access to the memory 99. As the result, the data for correction can be read out in synchronism with the TV scanning.

More specifically, referring to FIG. 14, data $X_1Y_1$, $X_2Y_1$, . . . and $X_7Y_1$ are read out at the first scanning line, which is followed by the reading of data $X_1Y_2$, $X_2Y_2$, $X_3Y_2$, ... and $X_7Y_2$ at the second scanning line. Finally, at the 480-th scanning line, data $X_1Y_{480}$, $X_2Y_{480}$, $X_3Y_{480}$, ... and $X_7Y_{480}$ are read out. In this way, by reading out the data in the horizontal direction for every scanning line and converting again into the analog quantities, there can be obtained the correction waveform smoothed in the vertical direction. The interpolation in the horizontal direction can be accomplished simply by allowing the data to pass through the low-pass filter 102 in view of the fact that the data are arrayed in a time-serial sequence in the horizontal direction.

In the description with reference to FIG. 11, it has been assumed that the writing of the correction data in the memory 90, the rewriting of the data read out from the memory 90 into the memory 99 and the reading of the correction data from the memory are effected at separate time points, respectively. It will however be appreciated that continuous processing can be realized by synchronising the aforementioned memory operations with one another by making use of a control line 103 which connects the address generators 93 and 100 to each other and a control line 104 through which the synchronizing signal is sent to the address generator 93 from the sync signal generator 94. More specifically, the correction data for every intersection are previously prepared by operator, while all the addresses are designated with the aid of the address input device 95. Upon initiation of operation, the correction data are stored in the memory 90 in synchronism with the synchronizing signal produced by the sync signal generator 94. Thereafter, the stored data are vertically read out from the memory 90 to thereby prepare the smoothed data which are then stored vertically in the memory 99 at the addresses designated by the address generator 100. Simultaneously with the completion of data storage in the memory 99, the data are read out therefrom in the horizontal direction at the address designated by the address generator 100 and supplied to the adder circuits 53 and 55 through the D/A converter 101 and the low-pass filter 102 together with the output signals of the horizontal saw-tooth wave generator 51 and the vertical saw-tooth wave generator 56 shown in FIG. 6 for effecting the correction.

Figure 15:
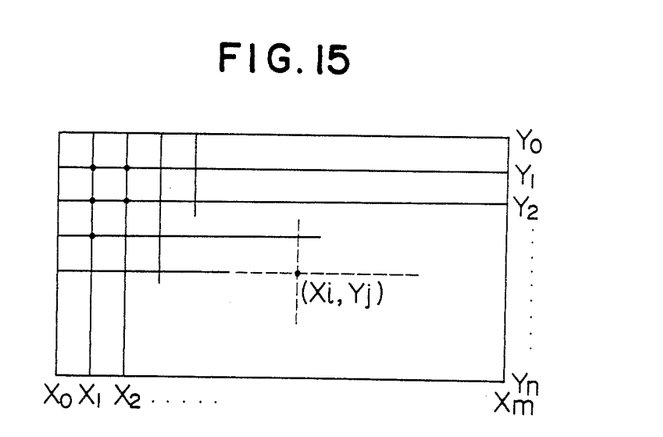
FIG. 15 is a view illustrating division of a television screen.
Figure 16:
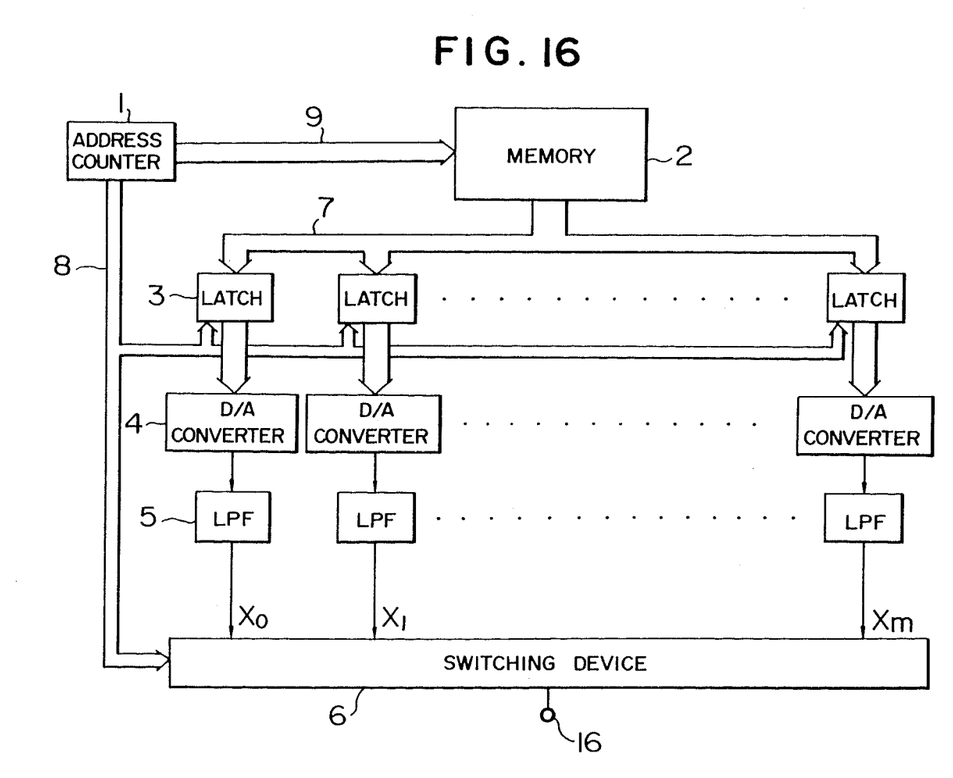
FIG. 16 is a block diagram showing a registration correcting signal generator circuit according to another embodiment of the invention.

FIG. 16 shows in a block diagram an arrangement of a registration correcting signal generating circuit according to another embodiment of the invention, and FIG. 15 is a view illustrating a storage map of a memory for storing the correcting data, which memory is used in the circuit shown in FIG. 16.

In FIG. 16, reference numeral 1 denotes an address counter, 2 denotes the memory, 3 denotes latches, 4 denotes D/A converters, 5 denotes low-pass filters, 6 denotes a switching device, 7 denotes a data bus, and 8 and 9 denote address busses.

Operation of the circuit shown in FIG. 16 is same as that of the circuit shown in FIG. 11 in respect that only the low-frequency components as required are extracted from the wave for the linear interpolation by using the low-pass filters 5 to thereby eliminate the unwanted high frequency components attributable to the inflection point. In view of the fact that the low-pass filters 5 are inserted in the vertical direction in the scanning of the television camera, the circuit shown in FIG. 16 is so arranged as to perform horizontal-to-vertical conversion of time-serial sequence. More specifically, with a view to realizing the horizontal-to-vertical conversion of time serial sequence, a number of the low-pass filters 5 which is equal to that of cross-points in the horizontal direction of the memory 2 are provided, whose outputs are changed over to one another by the switching device 6 in synchronism with the horizontal scanning period.

The memory 2 is divided by horizontal lines $X_0$, $X_1$, ... and $X_m$ and vertical lines $Y_0$, $Y_1$, ... and $Y_n$, wherein the distortion correcting data are stored at the intersections or cross-points $(X_i, Y_j)$ of the horizontal and vertical lines, as shown in FIG. 15. This configuration of the memory 2 may be regarded as representing a TV screen.

The memory 2 stores the distortion correcting data at every cross-points. This memory 2 can be accessed through the address bus 9 by generating the address $(X_i, Y_j)$ from the address counter 1 which is synchronized with the television camera. In the address represented by $(X_i, Y_j)$, j is held to be 0 (zero) for a period during which i is counted from 0 up to m, and j is subsequently held to be 1 during a succeeding period in which i is counted from 0 up to n. This counting operation is repeated until is finally held at n. In this way, the counter is operated only in the horizontal direction during a time span between the two cross-points located adjacent to each other as viewed in the vertical direction of the memory 2 since there are present a given number of the scanning lines (e.g. 32 lines) between the vertically adjacent cross-points while the same location is held in the vertical direction. When the contents of the counter has attained m, j is incremented by 1 to allow the counting operation to proceed to the next cross-point in the vertical direction. When the data for correction is read out from the cross-point of the memory 2 designated by the address supplied by way of the address bus 9, the data are temporarily stored in the latch 3.

It is assumed that arrangement is made such that the data read out from the cross-point of the address $(X_0, Y_0)$ and stored in the first latch 3 is held as it is until the address is updated to $(X_0, Y_1)$ The second latch 3 is loaded with the data of the address $(X_1, Y_0)$ and held until the address is updated to $(X_1, Y_1)$. In the similar manner, the (m+1)-th latch 3 is loaded with the data of the address $(X_m, Y_0)$ and held until the address is updated to $(X_m, Y_1)$.

On these conditions, consideration is made to the first latch 3. Data read out from the cross-points or intersections of the address $(X_0, Y_j)$ (where j is successively updated from 0 to n) are outputted from the first latch 3 and inputted sequentially to the associated D/A converter 4, the output signal of which is applied to the associated low-pass filter 5, resulting in that the analog signal $x_0$ containing no unwanted harmonics is obtained from the output of the filter 5.

In this way, m sets each comprising the latch 3, the D/A converter 4 and the low-pass filter 5 are provided for reading out the data of every vertical column of the memory 2 as the continuous time-serial sequence of the signals $x_0$, $x_1$, ... and $x_m$. These data are taken out in synchronism with the horizontal scanning of the television camera by means of the switching device 6.

The correction of distortion is effected by the signal produced at the output terminal 16 of the switching device shown in FIG. 16, which signal has passed through the low-pass filter 5. As the consequence, variation or change in the density of the scanning line is smoothed. In other words, the linearly interpolated waveform indicated by ③ in FIG. 7 is smoothed to the waveform ⑤ under action of the low-pass filter. The beam position at that time is located normally as indicated by a broken line curve ⑥. Accordingly, the signal level has a uniformity or linearity as indicated by a solid line curve ⑦, to assure the video signal of high definition or improved precision.

The foregoing description made with reference to FIG. 16 has been limited to the generation of the correction signal smoothed in the vertical direction which is then added with the output signal of the vertical saw-tooth wave generator 56 shown in FIG. 6. It goes without saying that the correction signal in the horizontal direction is additionally required which is to be added with the output signal of the horizontal saw-tooth wave generator 51. In the horizontal direction, the data are inherently continuous in the time-serial sequence. Accordingly, insertion of the low-pass filter for smoothing the horizontal correction signal will involve no difficulty without any further description.

Figure 17:
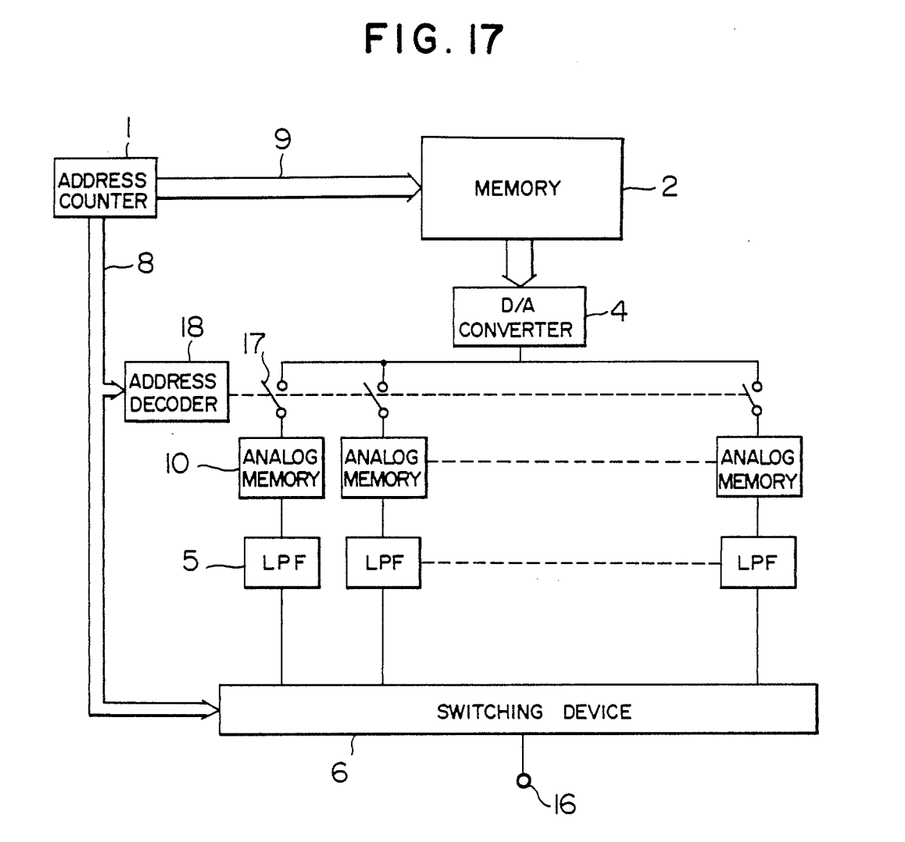
FIG. 17 is a block diagram showing a version of the registration correcting signal generator circuit shown in FIG. 16.

FIG. 17 shows in a block diagram a version of the circuit arrangement shown in FIG. 16.

The correction signal generating circuit shown in FIG. 17 differs from the one shown in FIG. 16 in that a single D/A converter 4 is provided in common to the preceding latch stages 3, to lower the manufacturing cost. The output signal of the single D/A converter 4 is successively sampled by switches 17 controlled by the output of an address decoder 18 to be successively stored in associated analog memories 10 each of which may be constituted by a capacitor, by way of example. The D/A converter 4 serves to convert the digital signal read out from the memory 2 into the analog signal. Accordingly, it is sufficient to sample the analog signal by selectively closing the switches 17 in an appropriate timing, to thereby store the sampled data in the analog memories 10. The other operation is utterly same as that of the circuit shown in FIG. 16.

As will be appreciated from the foregoing description, the present invention makes it possible to realize a registration circuit which permits a wide range of corrections and thus can enjoy an increased applicability because occurrence of the shading is positively prevented as compared with the hitherto known linear-interpolation based digital registration circuit. The registration correcting circuit according to the invention can be employed not only for correcting the registration in the multi-tube type color television camera but also as the dynamic focusing wave generator for the single-tube type color television camera and the convergence circuit of color television receivers as well as a wave generator for correcting the shading in the television signal.

We claim:

1. A circuit for generating a signal for correcting deflection of an electron beam, comprising:
memory means for storing in terms of digital values quantities of the correction at intersections defined by a plurality of lines extending in horizontal and vertical directions so as to divide a surface scanned by the electron beam into a plurality of areas;
conversion means for converting the digital signal read out from said memory means into an analog signal;
low-pass filter means for passing therethrough low frequency components of said analog signal outputted from said conversion means; and
means for generating from the output of said low-pass filter means quantities of correction for the scanning lines present between the two intersections located adjacent to each other in the vertical direction.

2. A circuit for generating a signal for correcting deflection of an electron beam, comprising:
memory means for storing in terms of digital values quantities of the correction at intersections defined by a plurality of lines extending in horizontal and vertical directions so as to divide a surface scanned by the electron beam into a plurality of areas;
a digital-to-analog converter for converting the digital signal read out from said memory means to an analog signal;
analog memories and low-pass filters connected to said analog memories, respectively, the number of said memories and filters being equal to the number of said intersections lying on the single horizontal line;
switching means for selecting periodically input terminals of said plural analog memories in a time-serial sequence to thereby cause the output signal of said digital-to-analog converter to be applied to said input terminals; and
switching means for selecting periodically the output signals of said plural low-pass filters in the time-serial sequence to thereby allow said output signals to be made available as the output signal of said circuit.

3. A circuit for generating a signal for correcting deflection of an electron beam, comprising:
memory means for storing in terms of digital values quantities of the correction at intersections defined by a plurality of lines extending in horizontal and vertical directions so as to divide a surface scanned by the electron beam into a plurality of areas;
digital-to-analog converters and low-pass filters connected thereto, the number of said converters and filters being equal to the number of said intersection lying on the single horizontal line;
means for supplying the digital signal read out from said memory means to said plural digital-to-analog converters; and
switching means for selecting periodically the output signals of said plural low-pass filters in a time-serial sequence to thereby produce the output signal of said circuit.

4. A circuit for generating a signal for correcting deflection of an electron beam, comprising:
a first memory for storing in terms of digital values quantities of the correction at intersections defined by a plurality of lines extending in horizontal and vertical directions so as to divide a surface scanned by the electron beam into a plurality of areas;
a digital-to-analog converter for converting the digital signal read out from said first memory into an analog signal;
a low-pass filter for passing therethrough low frequency components of the output signal of said digital to analog converter;
an analog-to-digital converter for converting the output signal of said low-pass filter into a digital signal by sampling said output signal at a sampling frequency higher than the frequency at which the quantities of correction stored in said first memory at the intersections arrayed in the vertical direction are read out;
a second memory for storing the output signal of said analog-to-digital converter; and
means for reading out the signal stored in said second memory in synchronism with the electron beam scanning.

5. A circuit for correcting registration in a color television camera, comprising:

memory means for storing in terms of digital values quantities of correction at intersections defined by a plurality of lines extending in horizontal and vertical directions so as to divide a surface of an imaging tube scanned by the electron beam into a plurality of areas;

conversion means for converting the digital signal read out from said memory means into an analog signal;

low-pass filter means for passing therethrough low frequency components of said analog signal outputted from said conversion means; and means for generating from the output of said low-pass filter means quantities of correction for the scanning lines present between the two intersections located adjacent to each other in the vertical direction.

6. A circuit for correcting registration in a color television camera, comprising:

memory means for storing in terms of digital values quantities of correction at intersections defined by a plurality of lines extending in horizontal and vertical directions so as to divide a surface of an imaging tube scanned by the electron beam into a plurality of areas;

a digital-to-analog converter for converting the digital signal read out from said memory means to an analog signal;

analog memories and low-pass filters connected to said analog memories, respectively, the number of said memories and filters being equal to the number of said intersections lying on the single horizontal line;

switching means for selecting periodically input terminals of said plural analog memories in a time-serial sequence to thereby cause the output signal of said digital-to-analog converter to be applied to said input terminals; and switching means for selecting periodically the output signals of said plural low-pass filters in the time-serial sequence to thereby allow said output signals to be made available as the output signal of said circuit.

7. A circuit for correcting registration in a color television camera, comprising:

memory means for storing in terms of digital values quantities of correction at intersections defined by a plurality of lines extending in horizontal and vertical directions so as to divide a surface of an imaging tube scanned by the electron beam into a plurality of areas;

digital-to-analog converters and low-pass filters connected thereto, the number of said converters and filters being equal to the number of said intersections lying on the single horizontal line;

means for supplying the digital signal read out from said memory means to said plural digital-to-analog converters; and switching means for selecting periodically the output signals of said plural low-pass filters in a time-serial sequence to thereby produce the output signal of said circuit.

8. A circuit for correcting registration in a color television camera, comprising:

a first memory for storing in terms of digital values quantities of correction at intersections defined by a plurality of lines extending in horizontal and vertical directions so as to divide a surface of an imaging tube the electron beam into a plurality of areas;

a digital-to-analog converter for converting the digital signal read out from said first memory into an analog signal;

a low-pass filter for passing therethrough low frequency components of the output signal of said digital-to-analog converter;

an analog-to-digital converter for converting the output signal of said low-pass filter into a digital signal by sampling said output signal at a sampling frequency higher than the frequency at which the quantities of correction stored in said first memory at the intersections arrayed in the vertical direction are read out;

a second memory for storing the output signal of said analog-to-digital converter; and means for reading out the signal stored in said second memory in synchronism with the electron beam scanning.

* * * * *